UNITED STATES PATENT OFFICE.

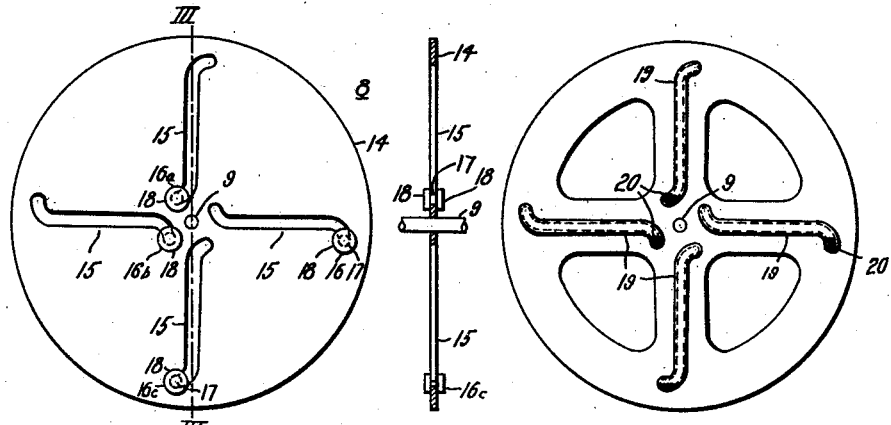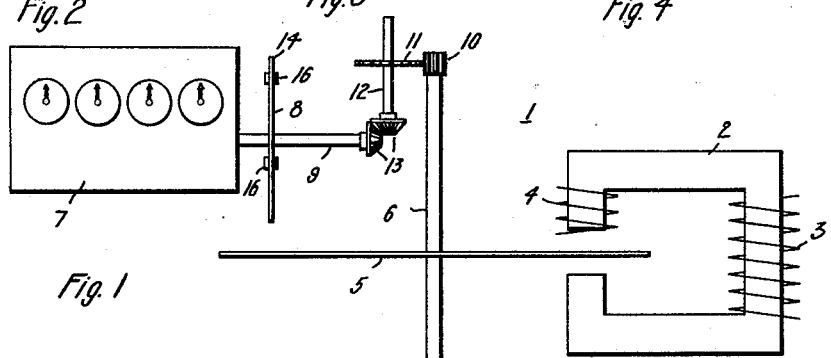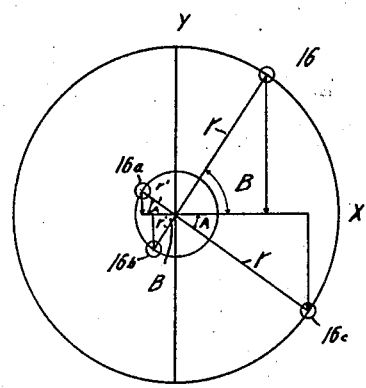

JOHN HAROLD MILLER, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

1,408,119.   Specification of Letters Patent.   Patented Feb. 28, 1922.

Application filed August 11, 1917. Serial No. 185,717.

*To all whom it may concern:*

Be it known that I, JOHN HAROLD MILLER, a citizen of the United States, and a resident of Wilkinsburg, in the county of Allegheny and State of Pennsylvania, have invented a new and useful Improvement in Electrical Measuring Instruments, of which the following is a specification.

My invention relates to electrical measuring instruments and particularly to excess-demand meters.

One object of my invention is to provide means for so restraining the operation of a watthour meter that it will operate only when the power traversing the same exceeds a predetermined value, thereby causing the watthour meter to indicate only the energy in excess of the predetermined power demand.

Another object of my invention is to provide a device of the above indicated character that shall be simple and inexpensive to construct and efficient in its operation.

In practicing my invention, I provide a rotatable member having radially disposed guideways and movable weight members that coact radially with the guideways to continuously oppose the operating torque of the meter. Thus, if the opposition so imposed is neutralized when a predetermined demand of power traverses the instrument, the only energy in excess of such predetermined demand will be indicated.

Figure 1 of the accompanying drawings is a side elevational view of the principal elements of an excess-demand meter embodying my invention; Fig. 2 is a front view of a rotatable member constructed in accordance with my invention; Fig. 3 is a view taken along the line III—III of Fig. 2; Fig. 4 is a view, similar to Fig. 2, of a modified form of rotatable member, and Fig. 5 is a vector diagram illustrating the operating principle of my device.

An electrical measuring instrument 1, such as a watthour meter, comprises a magnetizable core member 2, coils 3 and 4, an armature 5, a shaft 6, and an integrating mechanism 7.

A torque-opposing device 8 is interposed directly in the line of action of the instrument, between the armature 5 and the integrating mechanism 7, and is mounted on a horizontal shaft 9 that is driven by the meter shaft 6 through a pinion 10, a gear wheel 11, a shaft 12, and gear wheels 13.

Fig. 2 shows the device 8 as comprising a disk 14 in which a number of slots 15 are formed. The slots 15 are of substantially Z-shape, their middle or body portions being disposed radially and their inner and outer end portions being laterally bent in opposite directions with reference to such body portions. Weight members 16, 16$^a$, 16$^b$ and 16$^c$ are disposed with their middle portions 17 in the slots 15 in which they are held from lateral displacement by enlarged end portions 18.

With the relation of weights to slots as in Fig. 2, the disk has a clockwise rotative tendency, by reason of a greater turning moment of the weight member 16, in opposition to the counter-clockwise rotative tendency imparted by the meter and the weight members 16$^a$ and 16$^b$. When the disk 14 is rotated in counter-clockwise direction, weight member 16$^c$ exerts an opposing turning moment.

When the disk is turned through an angle of ninety degrees, the weight member 16 will drop to a position adjacent the shaft 9 where it will have a relatively smaller turning moment in opposition to the moment exerted while in its former position at the outer end of its slot. At the same time, weight member 16$^b$ will drop through its slot from a position adjacent the shaft 9 to a position adjacent the periphery of the disk 14 and be in position to exert a torque opposite that of the meter during the next further movement of the shaft 9.

This sequence of operation, by which two of the weight members having short radii assist the meter action and two other weight members having longer radii oppose the meter action, is continued, the weight members maintaining their positions during substantially one hundred and eighty degrees of movement by reason of the shapes of the slots. The transition of the weight members from the long radius position to the short radius position is effected when the slots are vertically above the shaft 9 and from the short radius position to the long radius position when the slots are vertically below the shaft 9, by reason of the shapes of the slots. These positions are those at which no turning moment is exerted.

When the disk is turned through an angle of forty-five degrees, the positions of the weights in the slot remain unchanged. The forces acting while the disk is in this position are illustrated in the diagram of Fig. 5. Letting W = the weight of each weight member.
$r$ = the radius at the outer end of a slot.
$r'$ = the radius at the inner end of a slot.
T = resistive torque.

Then $$T = [Wr \cos A + Wr \cos B] - [Wr' \cos A + Wr' \cos B]$$
$$= [Wr \cos A + Wr \cos (90° - A)] - [Wr' \cos A + Wr' \cos (90° - A)]$$
$$= [Wr \cos A + Wr \sin A] - [Wr' \cos A + Wr' \sin A]$$
$$= Wr (\cos A + \sin A) - Wr' (\cos A + \sin A)$$
$$= W (r - r') (\cos A + \sin A)$$

For simplicity, I have shown only four slots, but, by increasing this number, the effect of the variable factor ($\cos A + \sin A$) may be made negligible.

Thus, since W is a constant, and ($r - r'$) is a constant, it will be apparent that a choice of W, $r$ and $r'$ may be made to give any desired degree of opposition to the operating torque of the meter. A modified form of my invention is shown in Fig. 4 in which glass tubes 19 containing globules of mercury are substituted for the slots 15 and weight members 16.

I do not limit my invention to the particular structure illustrated, as it may be variously modified without departing from the spirit and scope of the invention as set forth in the appended claims.

I claim as my invention:

1. In a measuring instrument, the combination with an actuating member, of a rotatable member operatively connected thereto, the latter being provided with radial guideways having offset portions, and weight elements co-operating with the guideways to exert a predetermined resistance to the movement of the actuating member.

2. In a measuring instrument, the combination with an actuating member, of a rotatable member operatively connected thereto and having guideways of substantially Z-shape therein, and weight members co-operating with the guideways to exert a substantially constant resistance to the movement of the actuating member.

3. In a measuring instrument, the combination with an actuating member, of a rotatable member connected thereto having guideways of substantially Z-shape, the middle legs of which are radially disposed, and weight members co-operating with the guideways throughout their lengths to continuously oppose the movement of the actuating member.

4. In a measuring instrument, the combination with an actuating member and an indicating device, of a rotatable member disposed between the actuating member and the indicating device and having guiding means thereon, and weight elements relatively-movably co-operating with said guiding means, said guiding means and weight elements being so related to permit relative movement thereof under certain conditions and to positively stop movement of the weight elements relative to the guiding means during a predetermined movement of the rotatable member as to constantly oppose the movement of the actuating member and to thereby cause the indicating device to indicate only in excess of a predetermined value.

In testimony whereof, I have hereunto subscribed my name this 30th day of July 1917.

JOHN HAROLD MILLER.